US012177901B2

(12) United States Patent
Lei et al.

(10) Patent No.: US 12,177,901 B2
(45) Date of Patent: Dec. 24, 2024

(54) METHOD AND APPARATUS FOR UPLINK DATA TRANSMISSION OR RECEPTION

(71) Applicant: Lenovo (Beijing) Limited, Beijing (CN)

(72) Inventors: Haipeng Lei, Haidian District (CN); Alexander Golitschek Edler von Elbwart, Darmstadt (DE); Joachim Löhr, Wiesbaden (DE)

(73) Assignee: Lenovo (Beijing) Limited, Beijing (CN)

( * ) Notice: Subject to any disclaimer, the term of this patent is extended or adjusted under 35 U.S.C. 154(b) by 385 days.

(21) Appl. No.: 17/640,580

(22) PCT Filed: Sep. 27, 2019

(86) PCT No.: PCT/CN2019/108732
§ 371 (c)(1),
(2) Date: Mar. 4, 2022

(87) PCT Pub. No.: WO2021/056471
PCT Pub. Date: Apr. 1, 2021

(65) Prior Publication Data
US 2022/0330340 A1 Oct. 13, 2022

(51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 72/1268* (2013.01); *H04W 74/006* (2013.01); *H04W 74/0875* (2013.01)

(58) Field of Classification Search
CPC ......... H04W 74/0816; H04W 72/0446; H04W 72/1268; H04W 74/006; H04W 74/0875; H04W 72/569; H04W 74/0808
See application file for complete search history.

(56) References Cited

U.S. PATENT DOCUMENTS

2016/0095117 A1* 3/2016 Doppler ............... H04W 16/14
455/454
2017/0238342 A1* 8/2017 Yang ................. H04W 72/543
370/329
(Continued)

FOREIGN PATENT DOCUMENTS

CN 105657722 A 6/2016

OTHER PUBLICATIONS

"International Preliminary Report on Patentability", PCT Application No. PCT/CN2019/108732, Apr. 7, 2022, 5 pages.
(Continued)

*Primary Examiner* — Michael A Keller
*Assistant Examiner* — Thao D Duong
(74) *Attorney, Agent, or Firm* — FIG. 1 Patents (57) ABSTRACT

The present application relates to a method and apparatus for uplink data transmission or reception. One embodiment of the subject application provides a method for uplink data transmission performed by a User Equipment (UE), comprising: receiving, from a base station (BS), a first signalling indicating a first channel access priority class value, wherein the first channel access priority class value is used by the BS for initiating a channel occupancy; receiving, from the BS, a second signalling scheduling a Physical Uplink Shared Channel (PUSCH) for transmitting uplink data; performing a channel access procedure; and transmitting, to the BS, the uplink data on the PUSCH in response to the channel access procedure being successful.

20 Claims, 6 Drawing Sheets

(51) Int. Cl.
*H04W 72/1268* (2023.01)
*H04W 74/00* (2009.01)
*H04W 74/08* (2024.01)

(56) References Cited

U.S. PATENT DOCUMENTS

| | | | |
|---|---|---|---|
| 2018/0049234 A1* | 2/2018 | Lee | H04W 72/1268 |
| 2019/0037601 A1* | 1/2019 | Noh | H04W 72/0446 |
| 2019/0069312 A1* | 2/2019 | Oh | H04L 5/0092 |
| 2019/0098658 A1* | 3/2019 | Noh | H04L 5/0053 |
| 2019/0159256 A1* | 5/2019 | Talarico | H04L 1/187 |
| 2019/0174546 A1* | 6/2019 | Jeon | H04W 74/0816 |
| 2020/0389264 A1* | 12/2020 | Hedayat | H04L 1/1896 |
| 2021/0168853 A1* | 6/2021 | Um | H04L 27/261 |
| 2021/0400696 A1* | 12/2021 | Maki | H04L 5/0051 |
| 2022/0014314 A1* | 1/2022 | Wang | H04L 1/08 |
| 2022/0377683 A1* | 11/2022 | Myung | H04W 74/0816 |
| 2023/0028341 A1* | 1/2023 | Park | H04W 74/0808 |

OTHER PUBLICATIONS

"International Search Report and Written Opinion", PCT Application No. PCT/CN2019/108732, Jun. 30, 2020, 6 pages.
BROADCOM , "Discussion on short fixed duration LBT for transmissions outside a COT", 3GPP TSG RAN WG1 Meeting #96, R1-1903370, Athens, Greece, Feb. 2019, 6 pages.
Nokia , et al., "On channel access for autonomous UL access", 3GPP TSG-RAN WG1 Meeting #90, R1-1713861, Prague, Czech Republic, Aug. 2017, 5 pages.

\* cited by examiner

METHOD AND APPARATUS FOR UPLINK DATA TRANSMISSION OR RECEPTION

TECHNICAL FIELD

The subject application relates to the $3^{rd}$ Generation Partnership Project (3GPP) 5G new radio (NR), especially to a method and apparatus for uplink data transmission or reception.

BACKGROUND OF THE INVENTION

Base stations (BSs) and user equipment (UE) may operate in both licensed and unlicensed spectrum. In order to achieve fair coexistence with other wireless systems, a channel access procedure, for example, Listen Before Talk (LBT), is required before a transmitter can start the transmission on unlicensed spectrum. Only when the LBT is successful, the transmitter can start the transmission on the channel and occupy the channel up to a maximum channel occupancy time (MCOT); otherwise, the transmitter can't start the transmission and continue to performing LBT until the LBT is successful.

Therefore, it is necessary for a UE to know the LBT related information.

SUMMARY

It is desirable to provide a solution to indicate the LBT related information to a UE for uplink data transmission.

One embodiment of the subject application provides a method for uplink data transmission performed by a User Equipment (UE), including: receiving, from a base station (BS), a first signalling indicating a first channel access priority class value, wherein the first channel access priority class value is used by the BS for initiating a channel occupancy; receiving, from the BS, a second signalling scheduling a Physical Uplink Shared Channel (PUSCH) for transmitting uplink data; performing a channel access procedure; and transmitting, to the BS, the uplink data on the PUSCH in response to the channel access procedure being successful.

Another embodiment of the subject application provides a method for uplink data reception performed by a Base Station (BS), including: transmitting, to a user equipment (UE), a first signalling indicating a first channel access priority class value, wherein the first channel access priority class value is used by the BS for initiating a channel occupancy; transmitting, to the UE, a second signalling scheduling a Physical Uplink Shared Channel (PUSCH) for transmitting uplink data; and receiving, from the UE, the uplink data on the PUSCH.

Yet another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including receiving, from a base station (BS), a first signalling indicating a first channel access priority class value, wherein the first channel access priority class value is used by the BS for initiating a channel occupancy; receiving, from the BS, a second signalling scheduling a Physical Uplink Shared Channel (PUSCH) for transmitting uplink data; performing a channel access procedure; and transmitting, to the BS, the uplink data on the PUSCH in response to the channel access procedure being successful.

Still another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including transmitting, to a user equipment (UE), a first signalling indicating a first channel access priority class value, wherein the first channel access priority class value is used by the BS for initiating a channel occupancy; transmitting, to the UE, a second signalling scheduling a Physical Uplink Shared Channel (PUSCH) for transmitting uplink data; and receiving, from the UE, the uplink data on the PUSCH.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for downlink (DL) or uplink (UL) data transmission on unlicensed spectrum. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
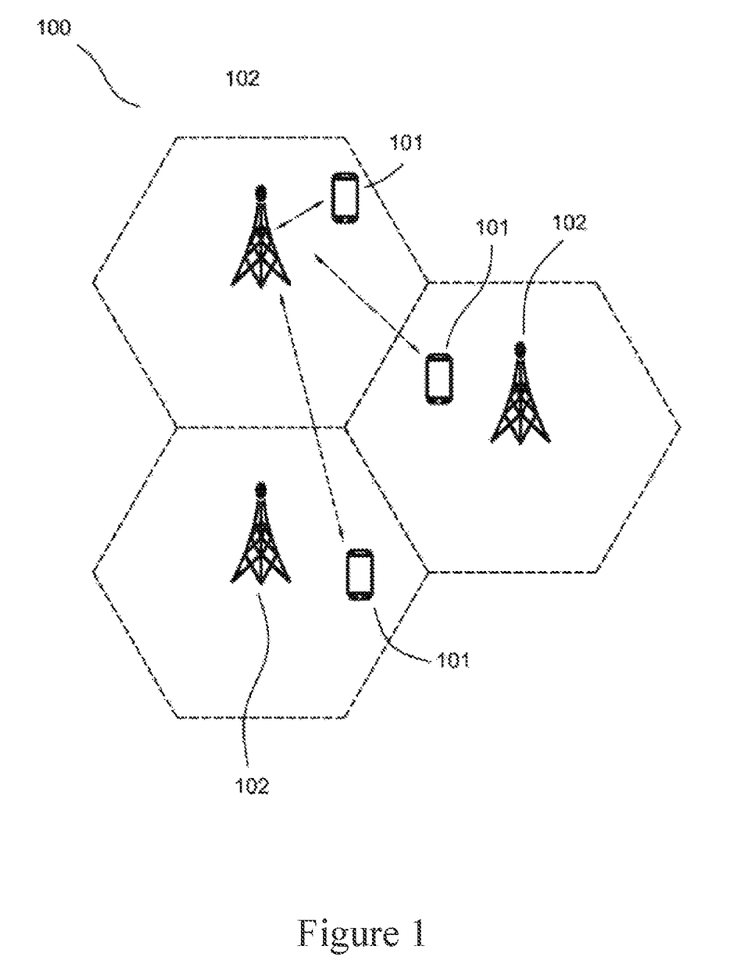
FIG. 1 illustrates a schematic diagram of a wireless communication system according to some embodiments of the subject disclosure.

FIG. 1 depicts a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

In Rel-14 LTE eLAA, the following fields are included in DCI scheduling PUSCH transmission:
  Channel Access Priority Class (CAPC) (2 bits)
  Channel Access type (1 bit)
  PUSCH starting position (2 bits)

The field of channel access type indicates the LBT type performed by the UE before the PUSCH transmission. The two-bit channel access priority class indicates priority class value which the gNB used for initiating the COT.

The channel access procedure includes multiple types of operations. For example, one type of the operations is a LBT category 4 operation (hereinafter referred to as LBT Cat. 4 in the subject disclosure) with a random backoff counter selected from a variable contention window (also named Type 1 UL channel access procedure in TS37.213). Another type of the operations is a LBT category 2 operation (hereinafter referred to as LBT Cat. 2 in the subject disclosure), also named Type 2 UL channel access procedure in TS37.213. With LBT Cat. 2, a UE may transmit the transmission immediately after sensing the channel to be idle for at least a sensing interval of 25 microseconds. A LBT Cat. 2 with a sensing interval of 16 microseconds is also supported. Still another type of the operations is a LBT category 1 operation, which suggests no LBT operation.

In TS37.213, the existing UL CAPC has four values: 1, 2, 3, and 4, for LBT Cat. 4 (i.e., UL Type 1 channel access procedure). Each UL CAPC value corresponds to a specific contention window where a random backoff counter is generated. The priority of the CAPC is inversely proportional to the CAPC value. For example, the priority of the data with the CAPC value 4 is lower than the priority of the data with the CAPC value 1, 2, or 3.

If the DCI indicates a UE to perform a LBT Cat. 4, and the scheduled PUSCH is inside of the gNB initiated COT, then the UE will compare the CAPC value indicated in the DCI (named the first CAPC value) with the CAPC value of the uplink data (named the second CAPC value). If the second CAPC value is smaller than or equal to the first CAPC value, in other words, the priority of the uplink data to be transmitted by the UE is higher than or equal to the priority indicated in the UL grant, and then the UE will switch the LBT Cat. 4 to LBT Cat. 2 and transmit uplink data on the PUSCH. If the second CAPC value is greater than the first CAPC value, in other words, the priority of the uplink data to be transmitted by the UE is lower than the priority indicated in the UL grant, and then the UE should terminate the PUSCH transmission.

If the DCI indicates a UE to perform a LBT Cat. 4, and the scheduled PUSCH is outside of the gNB initiated COT, then the UE will perform LBT Cat. 4 before PUSCH transmission with the first CAPC value indicated in the DCI.

However, when a gNB prepares the content of a DCI, or a UL grant, it may not have an accurate knowledge of the buffer status or traffic Quality of Service (QoS) of the UE's uplink data. Therefore, the gNB may not be able to predict the CAPC value of the uplink data stored in the UE's buffer which is to be transmitted over unlicensed carrier. Accordingly, it might not be practical for the gNB to indicate an appropriate CAPC value in UL grant especially when the UE supports multiple traffic QoS flows.

Furthermore, when a gNB prepares the content of a DCI, or a UL grant, it may not have the knowledge whether the scheduled PUSCH is inside or outside of the gNB-initiated COT, either. For example, the time offset between the UL grant and scheduled PUSCH might be quite long due to PUSCH being scheduled in UL burst following the DL burst. For another example, the gNB performs one channel access procedure simply for transmitting an UL grant and performs another channel access procedure for transmitting DL transmissions, under this condition, the new gNB-initiated COT may overlap with the scheduled PUSCH.

Suppose the gNB schedules a PUSCH which is deemed as being outside of the gNB's ongoing COT, then the CAPC value in the UL grant indicates the CAPC value which is to be used by the UE for initiating a COT. However, if the scheduled PUSCH falls inside of a gNB-initiated COT, which maybe the same or different COT from the gNB-initiated COT for transmitting the UL grant, the UE regards the CAPC value in UL grant is the CAPC value used by the gNB for initiating the COT. In that sense, the UE may terminate its UL transmission in case the CAPC value of the uplink data is greater than the CAPC indicated in the UL grant. In other words, the CAPC value in the UL grant configured by the gNB is intend to be the second CAPC value for the UE to initiate a COT, while the UE considers the CAPC value is the first CAPC value used by the gNB for initiating the COT. So misunderstanding on CAPC value between the gNB and the UE is caused.

In addition, it also imposes an unnecessary complexity on the gNB because the gNB is required to keep track of Buffer Status Report (BSR) and traffic QoS of uplink received data for determining the second CAPC value for the UEs. Moreover, with autonomous uplink (AUL) transmission specified in LTE Rel-15 FeLAA, the UE already has the capability to select the correct CAPC value based on the contents of the uplink data to be transmitted. This mechanism is completely under network control since network maps logical channels to channel access priority class values. In this sense, it is better to have a unified solution for a UE to determine the CAPC value for both uplink dynamic scheduling and configured grants.

In this disclosure, we focus on the signaling details for LBT type indication and provide several embodiments. In particular, the subject disclosure focuses on determining the CAPC value and the LBT type.

Since the existing CAPC value includes four values: 1, 2, 3, and 4, so 2 bits are needed to indicate the CAPC value. The LBT types included in the subject disclosure includes four types: LBT Cat. 1, LBT Cat. 2 with 16 us sensing interval, LBT Cat. 2 with 25 us sensing interval, and LBT Cat. 4. Therefore, 2 bits are also required to indicate the LBT type.

Figure 2:
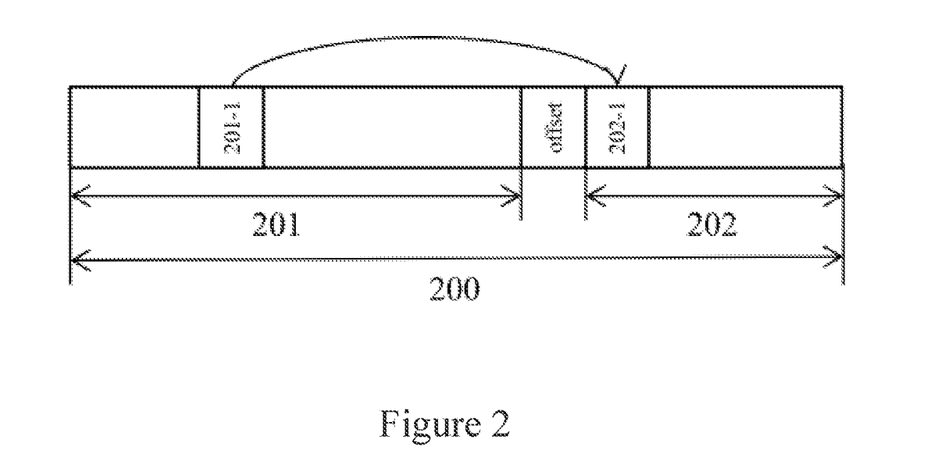
FIG. 2 illustrates a scheduled PUSCH transmission inside of a gNB-initiated Channel Occupancy Time (COT) according to a preferred embodiment of the subject disclosure.

FIG. 2 illustrates a scheduled PUSCH transmission inside of a gNB-initiated COT according to a preferred embodiment of the subject disclosure. In FIG. 2, the gNB initiate a Channel Occupancy 200, the UL grant 201-1 schedules a PUSCH 202-1, which is inside the gNB-initiated COT 200 and at the beginning of the UL burst 202. The offset is between the ending of the DL burst 201 and the beginning of the UL burst 202.

In a preferred embodiment, the subject disclosure proposes that the UL grant 201-1 neither indicates the LBT type nor indicates the CAPC value. LBT Cat. 4 is regarded as the default LBT type for the uplink PUSCH transmission. The 2 bits for indicating the CAPC value and the 2 bits for indicating the LBT type are saved. Therefore, 4 bits are saved in the UL grant in this embodiment.

In this embodiment, the CAPC value used by the UE (named the second CAPC value, or UL CAPC value) for performing LBT Cat. 4 is determined by the UE based on the uplink traffic data. The gNB could indicate the CAPC value used by the gNB (named the first CAPC value, or DL CAPC value) for initiating the gNB's COT in a cell-specific manner. For instance, the first CAPC value may be indicated in a group common Physical Downlink Control Channel (PDCCH) indicating the structure of the gNB's COT (e.g., DL burst duration, UL burst duration, and the duration of the offset between the DL burst and the UL burst), a DCI format 2_0 for transmitting Slot Format Information (SFI) or any other common PDCCH.

The presence of the first CAPC field in the UL grant is explicitly configured by Radio Resource Control (RRC) signalling. That is, if the RRC signalling configures that the UL grant includes the first CAPC field, then the UL grant includes the first CAPC value for the gNB to initiate the gNB's COT. Under this condition, the UL grant includes 2 bits for indicating the first CAPC value.

Alternatively, the presence of the first CAPC field in the UL grant is dependent on whether the gNB is willing to share its COT for the UE to perform uplink data transmission. If the gNB configures Downlink to Uplink (DL-to-UL) sharing is allowed, in other words, the gNB is willing to share its COT for the UE to perform uplink data transmission, then the UE assumes the UL grant includes the first CAPC field. This field indicates the first CAPC value which was used by gNB for initiating the gNB's COT. In this case, the UL grant also includes 2 bits for indicating the CAPC value. If the gNB configures the DL-to-UL sharing is not allowed, then the UE assumes the UL grant does not include the first CAPC field. In this embodiment, 2 bits for indicating the CAPC value are saved.

Based on the COT structure signaling, the SFI or any other information, the UE can derive the UL burst 202 information within the gNB-initiated COT 200, for example, the offset between the ending of the DL burst 201 and the beginning of the UL burst 202, the duration of the UL burst 202, etc. Accordingly, the UE can determine whether the scheduled PUSCH 202-1 is inside or outside of the gNB-initiated COT 200.

If the UE determines the scheduled PUSCH 202-1 is inside of the gNB-initiated COT 200, then the UE shall perform LBT Cat. 2 before PUSCH transmission. For example, in FIG. 2, the scheduled PUSCH 202-1 is inside of the gNB-initiated COT 200, and the UE will perform LBT Cat. 2 before PUSCH transmission.

If the first CAPC value used by the gNB is higher than or equal to the second CAPC value of the uplink data, that is, the priority of the downlink data of the gNB is lower than or equal to the priority of the uplink data of the UE, then the UE shall transmit the uplink data on the scheduled PUSCH. If the first CAPC value is lower than the first CAPC value, that is, the priority of the downlink data of the gNB is higher than the priority of the uplink data of the UE, then the UE shall terminate transmitting the uplink data on scheduled PUSCH.

Alternatively, if the UE determines the scheduled PUSCH 202-1 is inside of the gNB-initiated COT 200, then UE shall perform LBT Cat. 2 before PUSCH transmission. The UE shall only multiplex data (MAC SDU(s)) of logical channels (LCHs) into the PUSCH respectively the corresponding Transport Block (TB)/MAC PDU which have an associated CAPC value being equal to or lower than the CAPC value used by the gNB.

Essentially only LCH(s) fulfilling the CAPC condition, i.e. associated CAPC value is equal to or lower than the CAPC value used by the gNB, are considered for the LCP procedure, i.e. MAC layer performs LCH restriction according to the CAPC value used by the gNB. Similarly to LCH(s), also the mapping of MAC control elements to PUSCH resources may be restricted based on the CAPC value. The assumption here is that each MAC CE has an associated CAPC value.

It should be noted that the LCP procedure is only performed for initial transmissions. Hence in case a scheduled PUSCH carrying a HARQ retransmission falls inside the gNB-initiated COT, the following behaviour could be applied: if the CAPC value used by the gNB is higher than or equal to the CAPC value of the MAC PDU (uplink data), then the UE shall transmit the retransmission on the scheduled PUSCH; if the CAPC value used by the gNB is lower than the CAPC value of the MAC PDU (uplink data), then the UE shall terminate transmitting the retransmission on the scheduled PUSCH.

Alternatively a HARQ retransmission may be transmitted on a scheduled PUSCH regardless of the CAPC value of the MAC PDU, i.e. the UE always transmits the PUSCH.

In FIG. 2, the offset, which locates between ending of the DL burst 201 and beginning of the UL burst 202 within the gNB-initiated COT 200, is indicated in a field included in the COT structure signalling, the DCI format 2_0 for SFI or other common PDCCH. The offset may be indicated by a number of slots or a number of symbols. For example, the offset may include 4 slots and/or 10 symbols. The offset may be indicated with some predefined states. For example, at least three states are predefined: the first state indicates the offset is shorter than 16 us, the second state indicates the offset is equal to 16 us, the third state indicates the offset is longer than 16 us or 25 us while shorter than one symbol; other states may indicate the offset in slots or in symbols.

Alternatively, the COT structure signalling, the DCI format 2_0 for SFI or other common PDCCH may include two fields to indicate the offset. The first field indicates the offset in unit of slots or symbols, and the second field indicates the offset from a set of states. For example, the second field indicates one of at least three states: the first state indicates the offset is shorter than 16 us, the second state indicates the offset is equal to 16 us, and the third state indicates the offset is longer than 16 us or 25 us.

In some embodiments, the offset determines the LBT type performed by the UE. In FIG. 2, the UE determines the scheduled PUSCH 202-1 is inside of the gNB-initiated COT 200, if the indicated offset is shorter than 16 us and the scheduled PUSCH in located at the beginning of the UL burst, the UE shall transmit the PUSCH without performing LBT, i.e. performing LBT Cat. 1. If the indicated offset is equal to 16 us and the scheduled PUSCH in located at the beginning of the UL burst, the UE shall perform LBT Cat. 2 with 16 us duration before transmitting the PUSCH. If the indicated offset is longer than 16 us or 25 us, the UE shall perform LBT Cat. 2 with 25 us duration before transmitting the PUSCH. Please note that the gNB shall not configure an offset with a duration longer than 16 us and shorter than 25 us.

Figure 3:
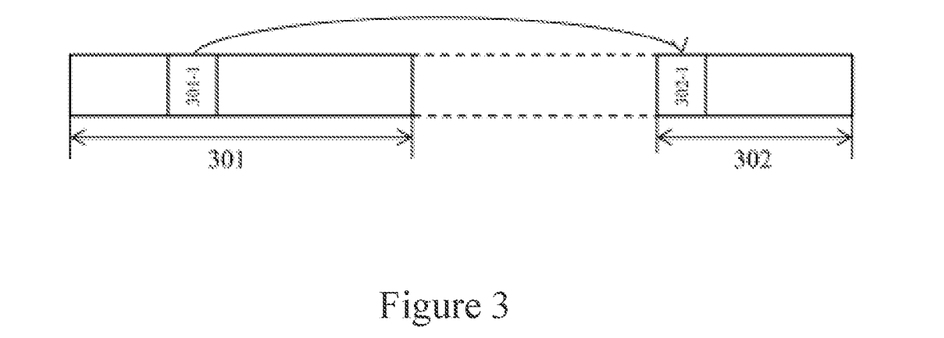
FIG. 3 illustrates a scheduled PUSCH transmission outside of a gNB-initiated COT according to a preferred embodiment of the subject disclosure.

FIG. 3 illustrates a scheduled PUSCH transmission outside of a gNB-initiated COT 301 according to a preferred embodiment of the subject disclosure.

If the UE determines the scheduled PUSCH 302-1 is outside of the gNB-initiated COT 301, or the UE is not able to determine whether its scheduled PUSCH 302-1 is a part of a shared gNB-initiated COT 301, then UE shall perform LBT Cat. 4 before PUSCH transmission. The second CAPC value used for the LBT Cat. 4 is determined by the UE based on the uplink data. Alternatively, the UE could be mandated by rule or configuration, to always use the CAPC value 4, i.e. the highest value that allows the longest COT and allows multiplexing of any data.

Figure 4:
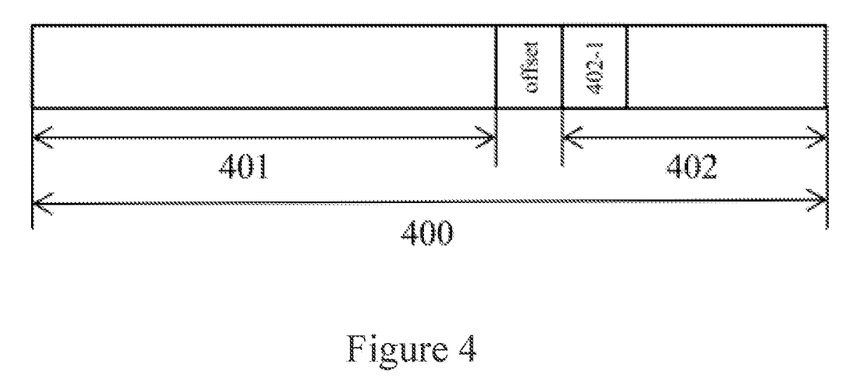
FIG. 4 illustrates a configured grant (CG) PUSCH transmission inside of a gNB-initiated COT according to a preferred embodiment of the subject disclosure.

FIG. 4 illustrates a CG-PUSCH transmission inside of a gNB-initiated COT according to a preferred embodiment of the subject disclosure.

In FIG. 4, the CG-PUSCH 402-1 falls within the gNB-initiated COT 400, and the UE determines whether it can transmit the CG-PUSCH by comparing the first CAPC value used by the gNB for initiating the COT with the second CAPC value of the uplink data.

The first CAPC value used by the gNB for initiating the COT is indicated in cell-specific manner, e.g., a group common PDCCH indicating the structure of the gNB's COT (e.g., DL burst duration, UL burst duration, and the duration of the offset between the DL burst and the UL burst), DCI format 2_0 for transmitting SFI or any other common PDCCH.

If the first CAPC value is higher or equal to the second CAPC value of the uplink data, then the UE shall transmit the uplink data on the CG-PUSCH; if the first CAPC value is lower than the second CAPC value of the uplink data, then the UE shall terminate transmitting the uplink data on the CG-PUSCH.

In FIG. 4, the UE determines that the CG-PUSCH 402-1 falls within the gNB-initiated COT 400, and the UE determines the LBT type based on the offset. The determination is similar to the determination in FIG. 2, that is, if the indicated offset is shorter than 16 us and the CG-PUSCH in located at the beginning of the UL burst 402, the UE shall transmit the CG-PUSCH without performing LBT, i.e. performing LBT Cat. 1. If the indicated offset is equal to 16 us and the CG-PUSCH in located at the beginning of the UL burst, the UE shall perform LBT Cat. 2 with 16 us duration before transmitting the CG-PUSCH. If the indicated offset is longer than 16 us or 25 us, the UE shall perform LBT Cat. 2 with 25 us duration before transmitting the CG-PUSCH. It is assumed that the gNB shall not make the offset with a duration longer than 16 us and shorter than 25 us.

Figure 5:
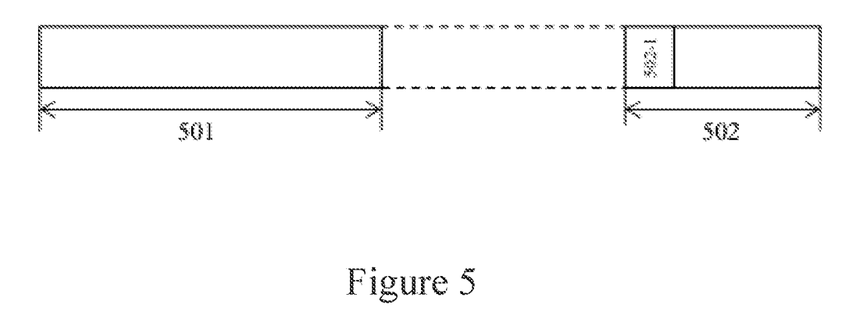
FIG. 5 illustrates a CG-PUSCH transmission outside of a gNB-initiated COT according to a preferred embodiment of the subject disclosure.

FIG. 5 illustrates a CG-PUSCH transmission outside of a gNB-initiated COT according to a preferred embodiment of the subject disclosure.

If the UE determines the CG-PUSCH 502-1 is outside of the gNB-initiated COT 501, or the UE is not able to determine whether its CG-PUSCH 502-1 is a part of a shared gNB-initiated COT 501, then the UE shall perform LBT Cat. 4 before PUSCH transmission. The second CAPC value used for the LBT Cat. 4 is determined by the UE based on the uplink data. Alternatively, the UE could be mandated by rule or configuration, to always use CAPC value 4, i.e. the highest value that allows the longest COT and allows multiplexing of any data.

In another preferred embodiment, the UL grant includes one-bit indicator to indicate whether the scheduled PUSCH is inside or outside of the gNB-initiated COT. The UL grant neither indicates the LBT type nor indicates the CAPC value. The 2 bits for indicating the CAPC value and the 2 bits for indicating the LBT type are saved. Accordingly, at least 3 bits are saved in the UL grant in this embodiment.

In one embodiment, the gNB may indicate the first CAPC value in a similar fashion as indicating manner in the embodiment in FIG. 2.

Alternatively, the presence of the first CAPC field which is used by the gNB for initiating the gNB's COT in the UL grant is explicitly configured by RRC signalling. Alternatively, the presence of the first CAPC field in the UL grant is dependent on whether the gNB is willing to share its COT for the UE to perform uplink data transmission. Please note that under this condition, the 2 bits for indicating the first CAPC value are not saved, thus 1 bit is saved in the UL grant.

Based on the one-bit indicator, the UE can explicitly know whether the scheduled PUSCH is inside or outside of the gNB-initiated COT, and the UE may determine the LBT type according to the scheduled PUSCH being inside or outside of the gNB-initiated COT.

For example, similar to the embodiment in FIG. 2, if the UE determines the scheduled PUSCH 202-1 is inside of the gNB-initiated COT 200, then the UE shall perform LBT Cat. 2 before PUSCH transmission. If the first CAPC value used by the gNB is higher than or equal to the second CAPC value of the uplink data, then the UE shall transmit the uplink data on the scheduled PUSCH. If the first CAPC value used by the gNB is lower than the CAPC value of the uplink data, then the UE shall terminate transmitting the uplink data on scheduled PUSCH.

For another example, similar to the embodiment in FIG. 3, if the UE determines the scheduled PUSCH 302-1 is outside of the gNB-initiated COT 300, then UE shall perform LBT Cat. 4 before PUSCH transmission. The second CAPC value used for the LBT Cat. 4 is determined by the UE based on the uplink data.

In this embodiment, the UE determines the LBT type in a similar fashion as the embodiment in FIG. 2, that is, the UE determines the LBT type based on the comparison between the first CAPC value and the second CAPC value, alternatively, the UE determines the LBT type based on the offset in a similar fashion as the embodiment disclosed in FIG. 2 as well.

In another preferred embodiment, the UL grant includes one-bit indicator to indicate the LBT type. In particular, the bit indicates the channel access procedure is a LBT Cat. 4 or not. The UL grant does not indicate the CAPC value. The 2 bits for indicating the CAPC value and 1 bit for indicating the LBT type are saved. Therefore, 3 bits are saved in the UL grant in this embodiment.

In this embodiment, the second CAPC value used for the LBT Cat. 4 is determined by the UE based on the uplink data, and the first CAPC value is indicated in a similar fashion as indicating manner in the embodiment in FIG. 2.

Alternatively, the presence of the first CAPC field in the UL grant is dependent on whether the gNB is willing to share its COT for the UE to perform uplink data transmission. Please note that under this condition, the 2 bits for indicating the first CAPC value are not saved, thus 1 bit is saved in the UL grant.

In this embodiment, based on the COT structure signaling, the SFI or any other information, the UE can derive the UL burst information within the gNB-initiated COT, for example, the offset between the ending of the DL burst and the beginning of the UL burst, the duration of the UL burst, etc. Accordingly, the UE can determine whether the scheduled PUSCH is inside or outside of the gNB-initiated COT.

Based on the scheduled PUSCH being inside or outside of the gNB-initiated COT, the UE determines the LBT type in a similar fashion as the embodiment as disclosed in FIG. 2, that is, the UE determines the LBT type based on the comparison between the first CAPC value and the second CAPC value, alternatively, the UE determines the LBT type based on the offset, which is also similar to the embodiment as disclosed in FIG. 2.

Similar to the embodiment in FIG. 3, if the UE determines the scheduled PUSCH 302-1 is outside of the gNB-initiated COT 300, then UE shall perform LBT Cat. 4 before PUSCH transmission. The second CAPC value used for the LBT Cat. 4 is determined by the UE based on the uplink data.

In another preferred embodiment, the UL grant includes one bit for indicating the LBT type being LBT Cat. 4 or non-Cat. 4, and the information indicated by another two bits are depend on the LBT type. If the LBT type is LBT Cat. 4, the another two bits in the UL grant indicate the first CAPC value used by the gNB for initiating the COT. If the LBT type is not LBT Cat. 4, the another two bits indicate the offset between the end of the DL burst and the beginning of the UL burst within the gNB-initiated COT is shorter than 16 us, equal to 16 us, or longer than 16 us or 25 us, etc.

When LBT Cat. 4 is indicated in UL grant, the first CAPC value is indicated in the UL grant by two bits. The UE can derive the UL burst information within the gNB-initiated COT based on the COT structure signaling, the SFI, etc. Accordingly, the UE can determine whether the scheduled PUSCH is inside or outside of the gNB-initiated COT.

If the UE determines the scheduled PUSCH is inside of the gNB-initiated COT, then the UE shall perform LBT Cat. 2 with 25 us duration before PUSCH transmission. If the CAPC value used by the gNB is higher or equal to the CAPC value of the uplink data, then the UE shall transmit the uplink data on scheduled PUSCH; if the CAPC value used by gNB is lower than the CAPC value of the uplink data, then the UE shall terminate transmitting the uplink data on the scheduled PUSCH.

If the UE determines the scheduled PUSCH is outside of the gNB-initiated COT, then the UE shall perform LBT Cat. 4 before PUSCH transmission. The CAPC value used for the LBT Cat. 4 is determined by the UE based on the uplink data. Therefore, the 2 bits for indicating the CAPC value in the UL grant are saved.

When non-LBT Cat. 4 is indicated in UL grant, the DL-to-UL offset is indicated in the UL grant by two bits. The UE may determine the LBT type based on the offset, or the DL-to-UL gap. That is, if the indicated offset is shorter than 16 us and the scheduled PUSCH in located at the beginning of the UL burst, the UE shall transmit the PUSCH without performing LBT, i.e. performing LBT Cat. 1. If the indicated offset is equal to 16 us and the scheduled PUSCH in located at the beginning of the UL burst, the UE shall perform LBT Cat. 2 with 16 us duration before transmitting the PUSCH. If the indicated offset is longer than 16 us or 25 us, the UE shall perform LBT Cat. 2 with 25 us duration before transmitting the PUSCH. Please note that the gNB shall not configure an offset with a duration longer than 16 us and shorter than 25 us.

Figure 6:
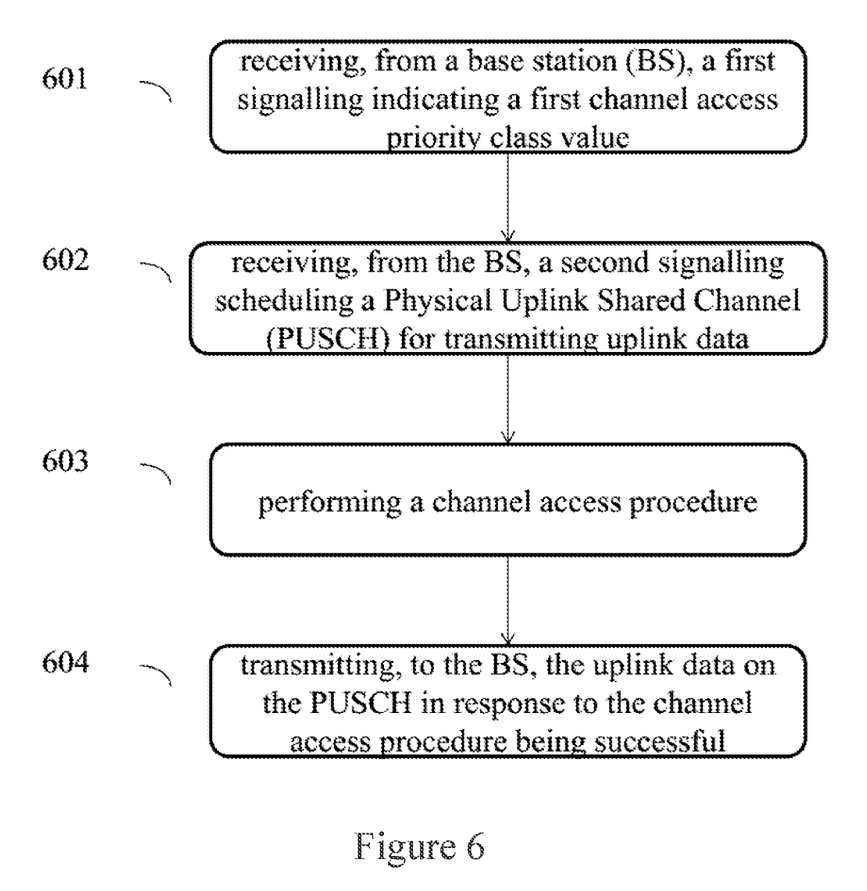
FIG. 6 illustrates a method performed by a UE for uplink data transmission according to a preferred embodiment of the subject disclosure.

FIG. 6 illustrates a method performed by a UE for uplink data transmission according to a preferred embodiment of the subject disclosure. In step 601, the UE receives a first signalling indicating a first CAPC value from the BS. For example, the first signaling can be a group common PDCCH indicating the structure of the gNB's COT (e.g., DL burst duration, UL burst duration, and the duration of the offset between the DL burst and the UL burst), a group common PDCCH indication the slot format information, or other common PDCCH. The first CAPC class value is used by the BS for initiating a channel occupancy. In step 602, the UE receives, a second signalling scheduling a PUSCH for transmitting uplink data from the BS, for example, the signalling may be the DCI 201-1 in FIG. 2 or RRC signaling for configured grant PUSCH transmission. In step 603, the UE performs a channel access procedure, e.g. LBT Cat. 4; and in step 604, the UE transmits the uplink data on the PUSCH to the BS in response to the channel access procedure being successful. The first signaling may be indicated in a common PDCCH.

Figure 7:
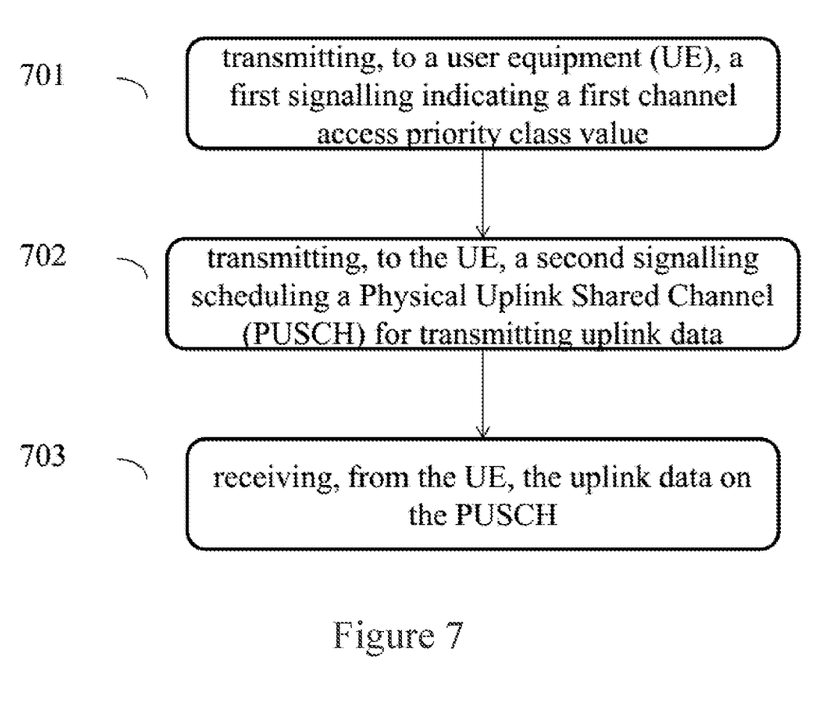
FIG. 7 illustrates a method performed by a BS for uplink data reception according to a preferred embodiment of the subject disclosure.

FIG. 7 illustrates a method performed by a BS for uplink data reception according to a preferred embodiment of the subject disclosure. In step 701, the BS transmits a first signalling indicating a first CAPC value from the BS. For example, the first signaling can be a group common PDCCH indicating the structure of the gNB's COT (e.g., DL burst duration, UL burst duration, and the duration of the offset between the DL burst and the UL burst), a group common PDCCH indication the slot format information, or other common PDCCH. The first CAPC class value is used by the BS for initiating a channel occupancy. In step 702, the BS transmits a second signalling scheduling a PUSCH for transmitting uplink data from the BS, for example, the DCI 301-1 in FIG. 3 or RRC signaling for configured grant PUSCH transmission. In step 703, the BS receives the uplink data from the UE. The BS may transmits the offset in FIG. 2 to the UE.

In one embodiment, the channel access procedure is a LBT Cat. 4 with a random backoff counter selected from a variable contention window. The UE use the second CAPC value corresponding to the uplink data to perform the LBT Cat. 4.

In another embodiment, when the UE determines that the uplink data is to be transmitted inside of the channel occupancy initiated by the BS, for example, the COT 200 in FIG. 2, the UE performs a channel access procedure with a minimum sensing interval, for example, the LBT Cat. 2 with 16 us duration.

In one embodiment, if the second CAPC value is greater than the first CAPC value, the uplink data is not transmitted inside the COT 200; if the CAPC value is smaller than or equal to than the first CAPC value, the uplink data is transmitted inside the COT 200.

In another embodiment, the minimum sensing interval of the channel access procedure, for example, 16 us or 25 us, is determined based on the offset between a downlink transmission burst and a following uplink transmission burst within the channel occupancy. In FIG. 2, the offset is between the ending of the DL burst 201 and the beginning of the UL burst 202. If the offset is 16 us, then the minimum sensing interval is 16 us, and if the offset is longer than 16 us, then the minimum sensing interval is 25 us. The offset may be indicated in the DCI 201-1 by a number of slots or a number of symbols. Alternatively, the offset may be indicated in 201-1 from a set of predefined states.

In one embodiment, the presence of the first CAPC value in the DCI is configured by RRC signalling; alternatively, the presence of the first CAPC value in the DCI is determined by whether the BS allows the uplink transmission in the COT.

In one preferred embodiment, the DCI also indicates whether the scheduled PUSCH is inside or outside of the channel occupancy. For example, the DCI 201-1 in FIG. 2 indicates that the scheduled PUSCH is inside of the COT 200, and the DCI 301-1 in FIG. 3 indicates the scheduled PUSCH is outside of the COT 301. The DCI may also indicates whether the channel access procedure is a Type-1 channel access procedure with a random backoff counter generated within a window, namely, whether the channel access procedure is a LBT Cat. 4. If the channel access procedure is a LBT Cat. 4, the DCI further indicates the first CAPC value. If the channel access procedure is not a LBT Cat. 4, the DCI further indicates the offset, for example, offset in FIG. 2.

Figure 8:
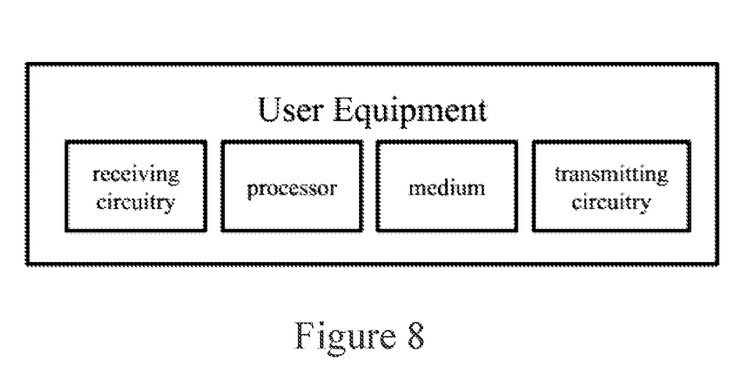
FIG. 8 illustrates a block diagram of a UE according to a preferred embodiment of the subject disclosure.

FIG. 8 illustrates a block diagram of a UE according to the embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 6) with the receiving circuitry, the transmitting circuitry and the processor. That is, upon performing the computer executable instructions, the receiving circuitry may receive, a first signalling indicating a first CAPC value from the BS, for example, the first signaling can be a group common PDCCH indicating the structure of the gNB's COT (e.g., DL burst duration, UL burst duration, and the duration of the offset between the DL burst and the UL burst), a group common PDCCH indication the slot format information, or other common PDCCH, and the first CAPC class value is used by the BS for initiating a channel occupancy, and further receives, a second signalling scheduling a PUSCH for transmitting uplink data from the BS, for example, the signalling may be the DCI 201-1 in FIG. 2 or RRC signaling for configured grant PUSCH transmission. The processor of the UE performs a channel access procedure, e.g. LBT Cat. 4; and the transmitting circuitry transmits the uplink data on the PUSCH to the BS in response to the channel access procedure being successful.

Figure 9:
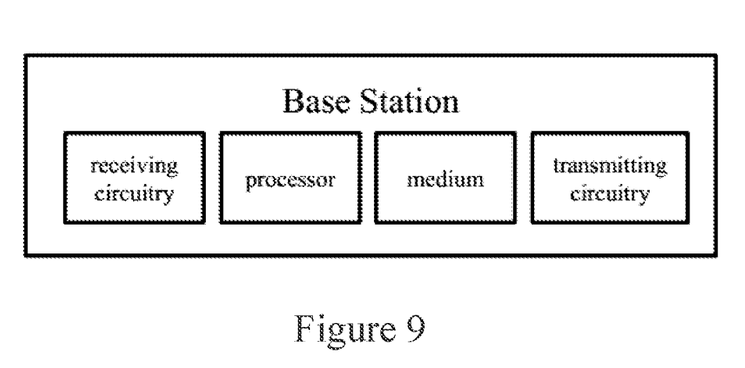
FIG. 9 illustrates a block diagram of a BS according to a preferred embodiment of the subject disclosure.

FIG. 9 illustrates a block diagram of a BS according to the embodiments of the present disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 7) with the receiving circuitry, the transmitting circuitry and the processor. That is, upon performing the computer executable instructions, the transmitting circuitry may transmit, a first signalling indicating a first CAPC value from the BS, for example, the first signaling can be a group common PDCCH indicating the structure of the gNB's COT (e.g., DL burst duration, UL burst duration, and the duration of the offset between the DL burst and the UL burst), a group common PDCCH indication the slot format information, or other common PDCCH, and the first CAPC class value is used by the BS for initiating a channel occupancy, and also transmits a second signalling scheduling a PUSCH for transmitting uplink data from the BS, for example, the DCI 301-1 in FIG. 3 or RRC signaling for configured grant PUSCH transmission. The receiving circuitry may receive the uplink data from the UE.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   receiving, from a network equipment (NE), a first signaling indicating a presence of a channel access priority class value in second signaling, wherein the channel access priority class value is used by the NE for initiating a channel occupancy associated with a channel occupancy time;
   receiving, from the NE, the second signaling, wherein the second signaling indicates the channel access priority class value and schedules a physical uplink shared channel (PUSCH) for transmitting uplink data;
   performing, responsive to receiving the second signaling, a channel access procedure; and
   transmitting, to the NE and based on the channel access priority class value, the uplink data on the PUSCH in response to the channel access procedure being successful.

2. The method of claim 1, wherein the channel access procedure is a Type-1 channel access procedure with a random backoff counter generated within a window.

3. The method of claim 2, wherein an additional channel access priority class value that corresponds to the uplink data is used for performing the Type-1 channel access procedure.

4. A user equipment (UE) for wireless communication, comprising:
   at least one memory; and
   at least one processor coupled with the at least one memory and configured to cause the UE to:
      receive, from a base station (BS), a first signaling indicating a presence of a channel access priority class value in second signaling, wherein the channel access priority class value is used by the BS for initiating a channel occupancy associated with a channel occupancy time;
      receive, from the BS, the second signaling, wherein the second signaling indicates the channel access priority class value and schedules a physical uplink shared channel (PUSCH) for transmitting uplink data;
      perform, responsive to receiving the second signaling, a channel access procedure; and
      transmit, to the BS and based on the channel access priority class value, the uplink data on the PUSCH in response to the channel access procedure being successful.

5. The UE of claim 4, wherein the channel access procedure is a Type-2 channel access procedure with a minimum sensing interval based on the uplink data being transmitted within the channel occupancy time.

6. The UE of claim 5, wherein the uplink data is not transmitted within the channel occupancy time in response to an additional channel access priority class value that corresponds to the uplink data being greater than the channel access priority class value.

7. The UE of claim 5, wherein the uplink data is transmitted within the channel occupancy in response to an additional channel access priority class value that corresponds to the uplink data being smaller than or equal to the channel access priority class value.

8. The UE of claim 5, wherein the minimum sensing interval is determined based on an offset between a downlink transmission burst and a following uplink transmission burst within the channel occupancy time.

9. The UE of claim 8, wherein the offset is indicated in downlink control information (DCI) by a number of slots or a number of symbols.

10. The UE of claim 8, wherein the offset is indicated in downlink control information (DCI) from a set of predefined states.

11. The UE of claim 5, wherein the minimum sensing interval is 16 microseconds in response to an offset between the second signaling and the PUSCH being 16 microseconds.

12. The UE of claim 5, wherein the minimum sensing interval is 25 microseconds in response to an offset between the second signaling and the PUSCH being longer than 16 microseconds.

13. The UE of claim 4, wherein the first signaling is indicated in a common physical downlink control information (PDCCH).

14. The UE of claim 4, wherein a presence of the channel access priority class value in the second signaling is determined by whether an uplink transmission is allowed to be transmitted within the channel occupancy time.

15. The UE of claim 4, wherein the second signaling further indicates whether the scheduled PUSCH is inside of or outside of the channel occupancy time.

16. The UE of claim 4, wherein the second signaling further indicates whether the channel access procedure is a Type-1 channel access procedure with a random backoff counter generated within a window.

17. The UE of claim 16, wherein the second signaling further indicates the channel access priority class value in response to the second signaling further indicating the channel access procedure is the Type-1 channel access procedure.

18. The UE of claim 16, wherein the second signaling further indicates an offset between a downlink transmission burst and a following uplink transmission burst within the channel occupancy time in response to the second signaling further indicating the channel access procedure is not the Type-1 channel access procedure.

19. A network equipment (NE) for wireless communication, comprising:
at least one memory; and
at least one processor coupled with the at least one memory and configured to cause the NE to:
transmit, to a user equipment (UE), a first signaling indicating a presence of a channel access priority class value in second signaling, wherein the channel access priority class value is used by the NE for initiating a channel occupancy associated with a channel occupancy time;
transmit, to the UE, the second signaling, wherein the second signaling indicates the channel access priority class value and schedules a physical uplink shared channel (PUSCH) for transmitting uplink data; and
receive, from the UE and based on the channel access priority class value, the uplink data on the PUSCH.

20. A processor for wireless communication, comprising:
at least one controller coupled with at least one memory and configured to cause the processor to:
receive, from a base station (BS), a first signaling indicating a presence of a channel access priority class value in second signaling, wherein the channel access priority class value is used by the BS for initiating a channel occupancy associated with a channel occupancy time;
receive, from the BS, the second signaling, wherein the second signaling indicates the channel access priority class value and schedules a physical uplink shared channel (PUSCH) for transmitting uplink data;
perform, responsive to receiving the second signaling, a channel access procedure; and
transmit, to the BS and based on the channel access priority class value, the uplink data on the PUSCH in response to the channel access procedure being successful.

* * * * *